United States Patent
Abe

(10) Patent No.: US 6,308,372 B1
(45) Date of Patent: Oct. 30, 2001

(54) MOUNTING STRUCTURE OF WIPER APPARATUS

(75) Inventor: Jun Abe, Ashikaga (JP)

(73) Assignee: Mitsuba Corporation, Kiryu (JP)

( * ) Notice: Subject to any disclaimer, the term of this patent is extended or adjusted under 35 U.S.C. 154(b) by 0 days.

(21) Appl. No.: 09/352,955

(22) Filed: Jul. 14, 1999

(30) Foreign Application Priority Data

Jul. 23, 1998 (JP) .................................................. 10-207657

(51) Int. Cl.$^7$ ....................................................... B60S 1/06
(52) U.S. Cl. .................. 15/250.31; 15/250.3; 296/96.17; 248/544
(58) Field of Search .............................. 15/250.3, 250.31, 15/250.27, 250.14; 296/96.15, 96.17, 192; 248/618, 544

(56) References Cited

U.S. PATENT DOCUMENTS

| | | | | |
|---|---|---|---|---|
| 3,874,249 | * | 4/1975 | Carpenter | ........................... 15/250.27 |
| 5,441,227 | * | 8/1995 | Hayashi | .............................. 15/250.3 |
| 5,956,800 | * | 9/1999 | Morin et al. | ......................... 15/250.3 |
| 5,960,512 | * | 10/1999 | Schael et al. | ...................... 15/250.31 |
| 6,168,223 | * | 1/2001 | Egner-Walter | .................... 296/96.17 |

FOREIGN PATENT DOCUMENTS

| | | | |
|---|---|---|---|
| 2219932 | * 12/1989 | (GB) | ................................... 15/250.3 |
| 2-7-51953 | 11/1995 | (JP) . | |
| 2-2512859 | 7/1996 | (JP) . | |

* cited by examiner

Primary Examiner—Gary K. Graham
(74) Attorney, Agent, or Firm—Oliff & Berridge, PLC

(57) ABSTRACT

A wiper apparatus including right and left hand pivot shafts and a wiper motor are incorporated into an integrated modular type holder member. A mounting section having a generally trapezoidal configuration is formed on a pivot holder to extend therefrom outwardly with respect to one of the pivot shafts. The wiper apparatus includes a trapezoidal insertion hole on a vehicle body side. The mounting section is inserted into the insertion hole loosely in a tilted posture when the pivot holder takes a mounting posture, and for mounting the wiper apparatus, using, as a lever, a supporting portion formed on the vehicle body side, the mounting section is pressed against an upper edge of the insertion hole having a smaller dimension.

16 Claims, 4 Drawing Sheets

MOUNTING STRUCTURE OF WIPER APPARATUS

BACKGROUND OF THE INVENTION

1. Field of Invention

The invention relates to a mounting structure of a vehicle wiper (windshield wiper) apparatus for mounting to motor vehicles, such as cars, buses and trucks.

2. Description of Related Art

Among vehicle wiper apparatus there is the modular type in which right and left hand pivot shafts to which right and left hand wiper arms are fitted and a wiper motor serving as a power source for placing these wiper arms into an oscillating or swinging motion are integrally built in a modular type holder member. In such a modular type wiper apparatus, the mounting or connection to a vehicle body is accomplished at three sections: right and left hand pivot holder sections and a motor holder section, as disclosed in JP-Y2-7-51953. Although the positions of the mountings of the right and left hand pivot holder sections to the vehicle body are provided at outer edge positions of a window or windshield (for example, at the driver side position), the mountings for the right and left hand pivot holder sections are outside the pivot shafts in the right and left directions to prevent interference with a link connecting the pivot shafts.

In recent years, to enlarge the vehicle interior space and improve the passenger's comfort, the windshield is laid out forwardly in an offset way in the vehicle, thereby resulting in less space for mounting a wiper apparatus. Additionally, the mounting positions of the modular type wiper apparatus to the vehicle body are set so as not to interfere with the link, as mentioned above. While the mounting of the wiper apparatus to the vehicle body requires mounting seats on the vehicle body side, difficulty is experienced in laying out the positions of the mountings within a limited mounting space of the vehicle body. Additionally, the window glass of the motor vehicle tends to be widened in the right and left directions, which needs a wider wiping area (window wiping rate) accordingly. As the width of the window in the right and left directions increases, the projecting positions of the pivot shafts on the outer edge side of the window become further offset outwardly in the right and left directions of the vehicle body.

Thus, on the outer edge side, not only is difficulty encountered in securing the mounting sections of the pivot holders to the vehicle body at the outsides of the pivot shaft positions in the right and left directions, but also, even if securable, the fixing of the mounting sections with bolts becomes difficult since the mounting sections are positioned at end portions of the vehicle body.

SUMMARY OF THE INVENTION

The invention has been developed in order to eliminate these problems in consideration of the above-described situations.

In accordance with the invention, there is provided a wiper apparatus including right and left hand pivot shafts and a wiper motor that are incorporated into an integrated modular type holder member, wherein a mounting section formed on one pivot shaft side of the holder member is formed to extend outwardly, and provided on the bracket attached to the vehicle body are an insertion hole accepting the mounting section loosely in a state where the mounting section is tilted with respect to an incorporating or mounting posture of the holder member and a supporting portion for supporting the holder member, the holder member coming into contact with the supporting portion and pressed against one side edge of the insertion hole to be supported on the supporting portion when the holder member is inserted and takes the mounting posture.

Thus, according to the invention, for mounting a wiper apparatus to a vehicle body, there is no need to fix one pivot shaft side of the holder member with a bolt, but it is simply a matter of the insertion of the mounting section into the insertion hole, and the upper edge side of the mounting section moves to an upper edge side of the insertion hole by using, as a supporting point of a lever, a portion of the holder member coming into contact with the supporting portion when the holder member is shifted from the tilted posture to the mounting posture, so that the mounting section can be supported in a state of being pressed against both the insertion hole and the supporting portion, thus achieving firm assembling.

In addition, the insertion hole has a non-circular configuration and the side of the insertion hole against which the mounting section is pressed has a smaller dimension than the mounting section. Accordingly, the rotation of the mounting section is preventable, and since the insertion hole width reduces toward the upper edge side, the mounting section can be supported in a state of being cut or bitten thereinto, thereby preventing the occurrence of play.

BRIEF DESCRIPTION OF THE DRAWINGS

The object and features of the invention will become more readily apparent from the following detailed description of the preferred embodiment taken in conjunction with the accompanying drawings in which.

DETAILED DESCRIPTION OF PREFERRED EMBODIMENTS

Figure 1:
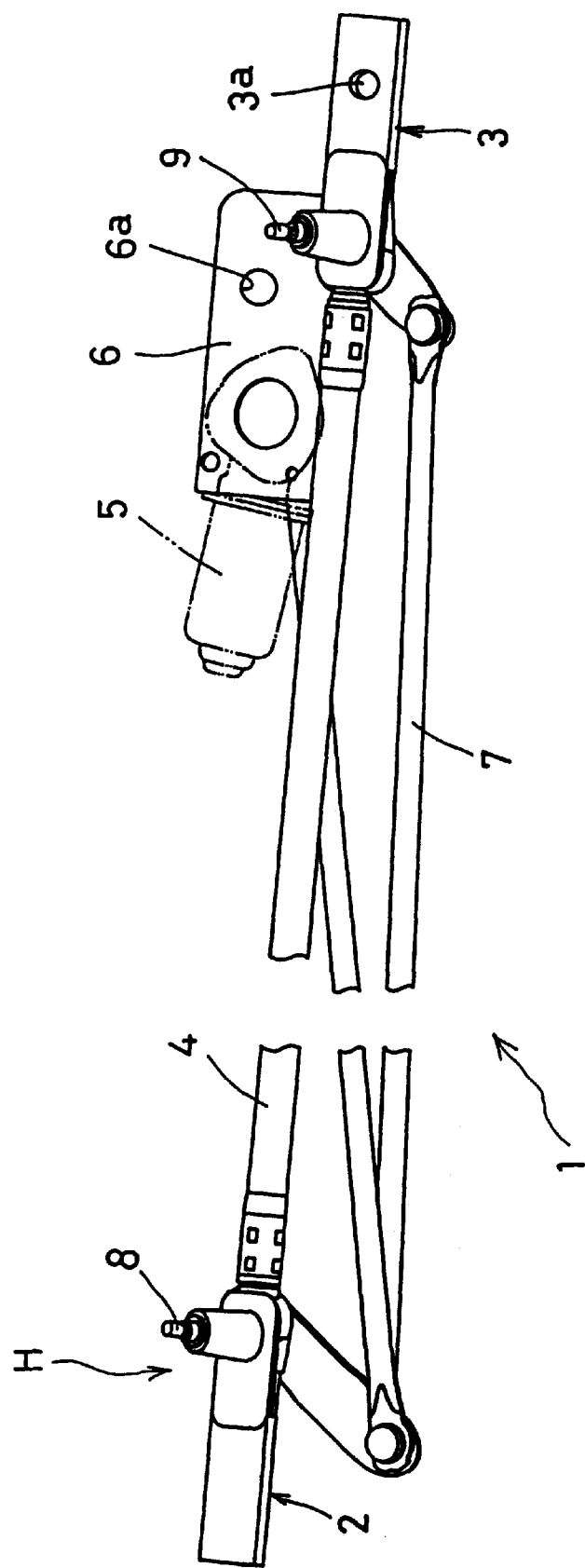
FIG. 1 is a perspective view partially showing a wiper apparatus according to an embodiment of this invention.
Figure 2:
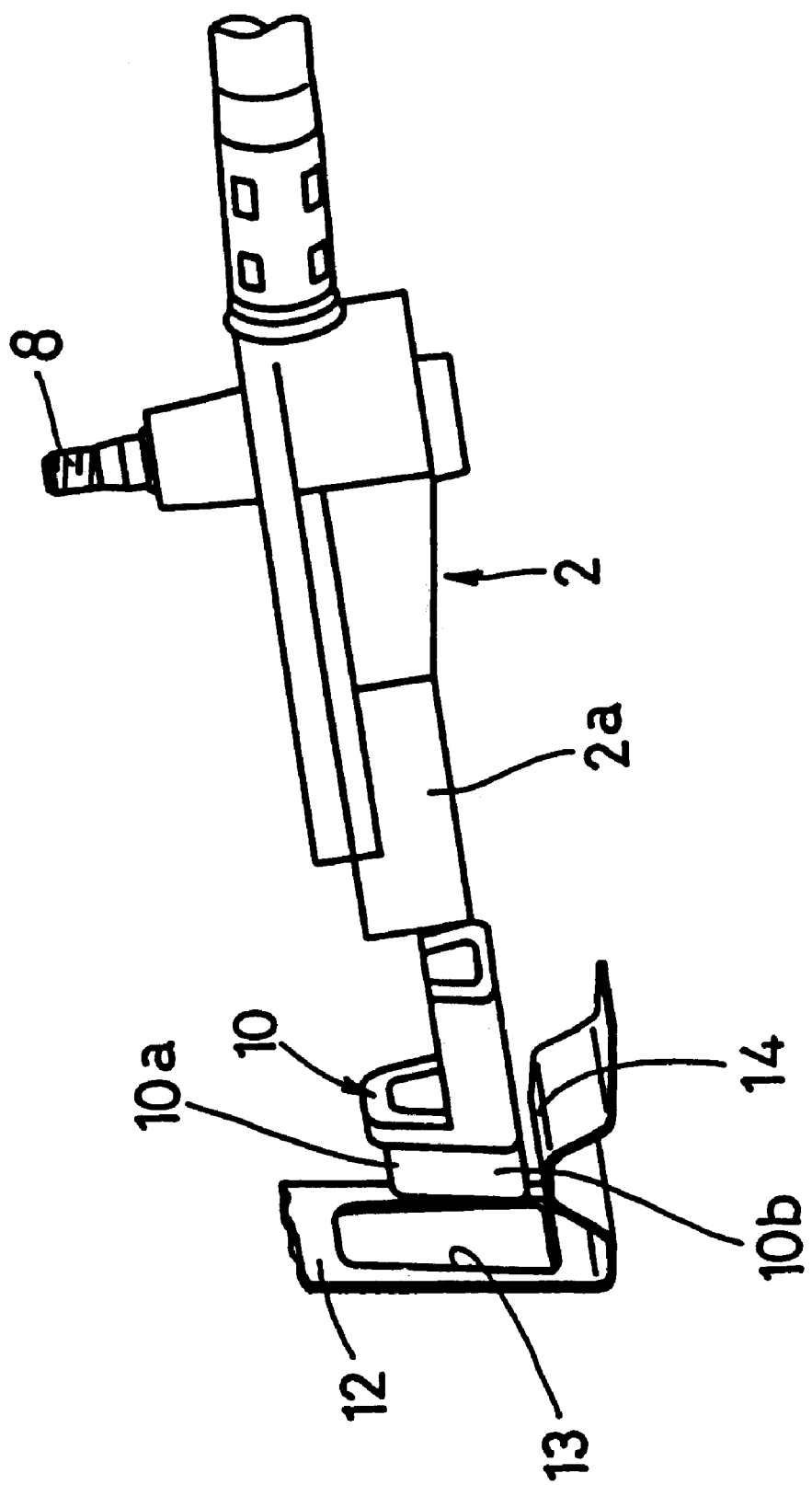
FIG. 2 is an exploded perspective view showing a pivot holder section.

Referring to the drawings, a description will be made hereinbelow of an embodiment of the invention.

A modular type wiper apparatus 1 includes right and left hand pivot holders 2, 3 are installed integrally through a connecting pipe 4 and a motor holder 6 in which a wiper motor 5 is built is fixedly secured to the connecting pipe 4 to constitute a modular type holder member H. A driving force of the wiper motor 5 is transmitted through a link member 7 to pivot shafts 8, 9 respectively provided on the pivot holders 2, 3 so that the pivot shafts 8, 9 rotationally oscillate in conjunction with the drive of the wiper motor 5, thereby causing wiper arms (not shown) fixed to the pivot shafts 8, 9 to oscillate to conduct window surface wiping operations.

Incidentally, the invention is not limited to employing the modular type holder member in which right and left hand pivot holders and a motor holder are integrated through the use of a connecting pipe, but is applicable to molded-in types formed according to a pattern molding technique.

One pivot holder 2 (e.g., the driver side pivot holder) is fixedly set on an outer edge side of a window surface in the right and left directions. In the pivot holder 2, a mounting section 2a is formed to extend outwardly with respect to the position of the pivot shaft 8 in the right and left directions. The mounting section 2a assumes a bar-like or tube-like configuration whose upper surface side has a shorter edge to form a generally trapezoidal shape in cross section, and a mount rubber 10 made of a rubber elastic material is fitted over an outer periphery of the mounting section 2a.

For the other pivot holder 3 and the motor holder 6, mounting portions or sections 3a, 6a are formed for bolt fixing.

Figure 3:
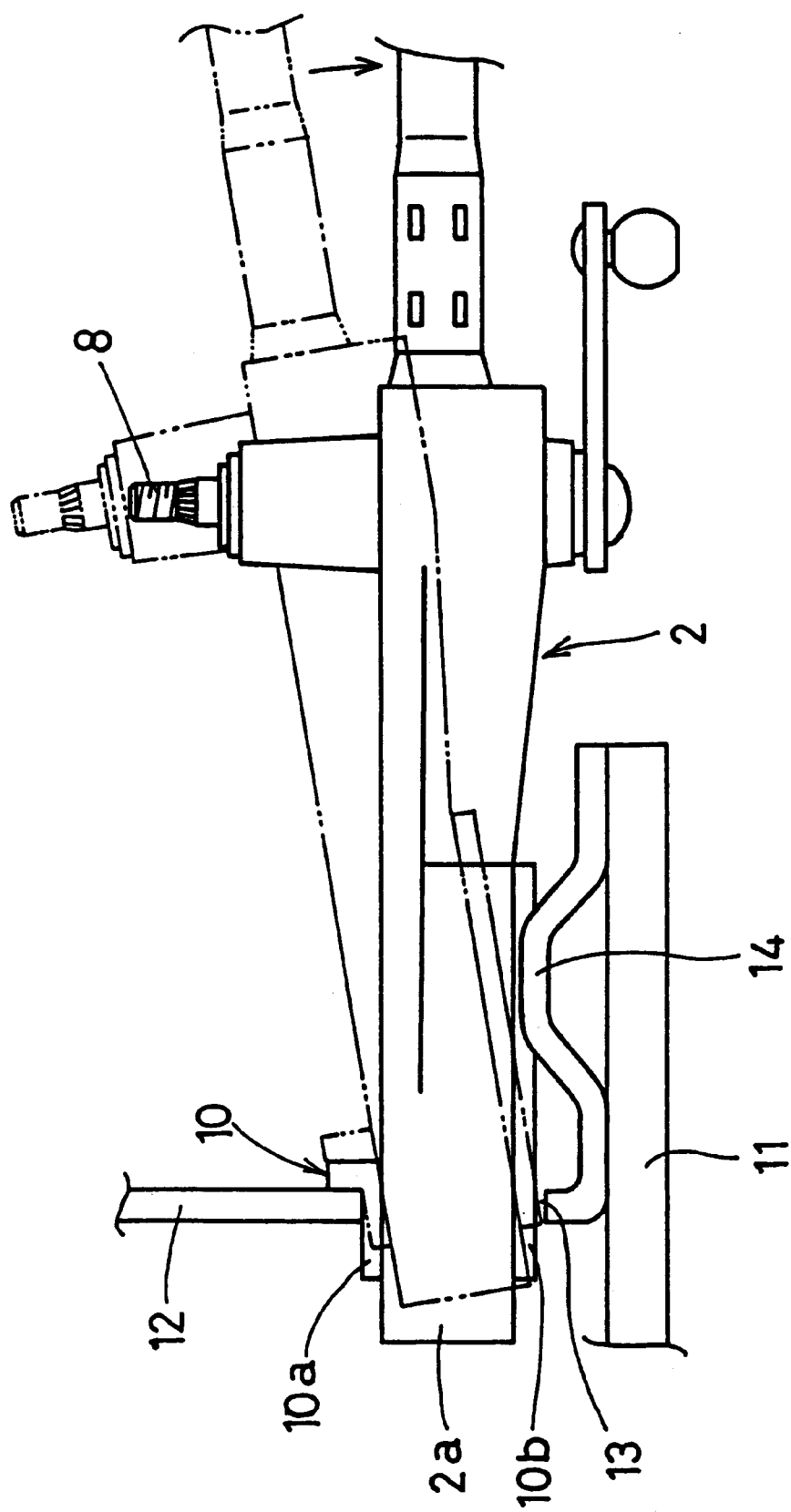
FIG. 3 is a cross-sectional view showing a mounting state of a pivot holder to a vehicle body.
Figure 4A:
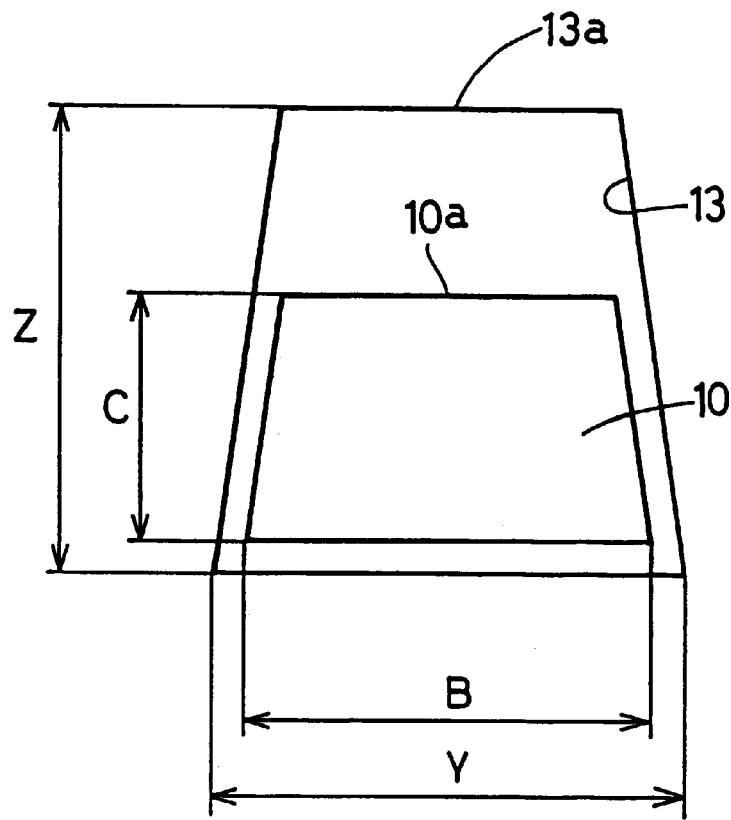
FIG. 4A is a dimension explanation illustration of a state of insertion of a mounting section into an insertion hole.
Figure 4B:
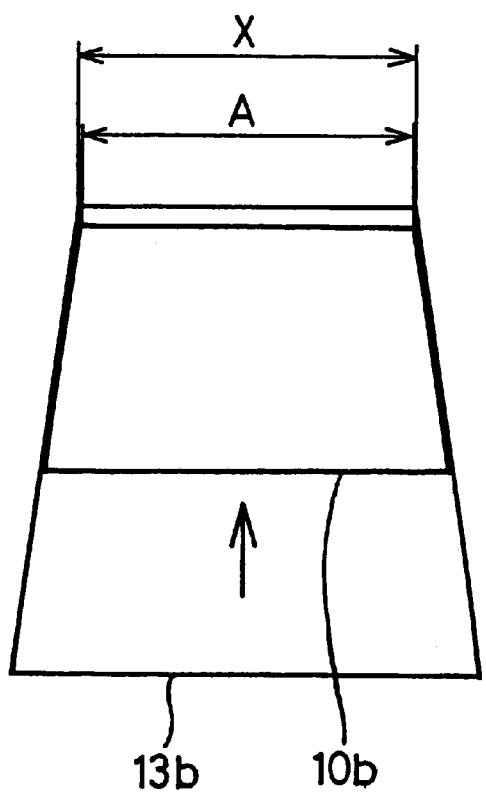
FIG. 4B is a dimension explanation illustration of fixing of the mounting section to the insertion hole.

An insertion hole 13 for accepting the mounting section 2a is made in a vehicle body inner plate, or bracket, 12 fixedly secured to the vehicle body frame 11. Insertion hole 13 has a generally trapezoidal shape equivalent to the mounting section 2a, and has a dimension set so that the mounting section 2a (in this embodiment, the mount rubber 10 is fitted over it) is fitted loosely therein. The length A of an upper edge or side 10a of the mount rubber 10 is set to be substantially equal to or slightly larger than the length X of an upper edge or side 13a of the insertion hole 13 (A≧X), while the length B of a lower edge 10b of the mount rubber 10 is set to be shorter than the length Y of a lower edge 13b of the insertion hole 13 (B<Y). The height C of the mount rubber 10 is set to be smaller than the height Z of the insertion hole 13 (C<Z). Each of the right and left hand edges of the mount rubber 10 is made to be substantially parallel with each of the right and left hand edges of the insertion hole 13. The mounting section 2a has a dimension set so that it can loosely inserted into the insertion hole 13 in a posture of being tilted to the upper edge 10a side with respect to the mounting posture (a state indicated by a solid line in FIG. 3) of the holder member H into the vehicle body.

A supporting portion 14 is formed by extending the vehicle body inner plate 12. This supporting portion 14 is installed on the lower edge 13b side of the insertion hole 13, but has a portion with a dimension set to be positioned above the lower surface of the mount rubber 10 when the mounting section 2a takes the mounting posture, and when the mounting section 2a inserted in the tilted posture (shown in dash-dot line in FIG. 3) is set to the mounting posture (shown in solid line in FIG. 3), the supporting portion 14 is brought into contact with the lower surface of the mount rubber 10, whereupon the mounting section 2a is pressed against the upper edge 13a side so that the lower side of the mounting section 2a is supported by the supporting portion 14 while the upper side of the mounting section 2a is supported by the upper edge 13a of the insertion hole 13.

To attach the wiper apparatus 1 to the vehicle body, the mounting section 2a is first inserted into the insertion hole 13 in a state where the holder member H takes the tilted posture, and the remaining mounting portions or sections 3a, 6a are then set with bolts while the holder member H is shifted to the mounting posture. The mounting of the wiper apparatus 1 is achievable with only these operations.

As described above, according to the invention, at the mounting of the wiper apparatus 1, there is no need to perform the fixing of the pivot shaft 8 side of the holder member H with bolts, only the insertion of the mounting section 2a into the insertion hole 13 is needed to fix pivot staff side 8 of the holder member H. Additionally, as the holder member H is shifted from the tilted posture to the mounting posture, the upper edge side of the mounting section 2a moves to the upper edge side of the insertion hole 13 using, as a supporting point of a lever, a portion of the holder member H coming into contact with the supporting portion 14, so that the mounting section 2a can be supported by the supporting portion 14 and the insertion hole 13, thus accomplishing firm assembling.

Since the insertion hole 13 and the mounting section 2a have a trapezoidal configuration, the rotation of the mounting section 2a is prevented, and since width of the insertion hole 13 becomes smaller in accordance with advancing toward the upper edge side, the upper edge 13a of the insertion hole 13 can cut or bite into the upper edge 10a of the mounting rubber 10 of the mounting section 2a, thereby enabling tight attachment.

This invention is not limited to the above-described embodiment. For example, the configurations of the mounting section and the insertion hole are not limited to a trapezoidal shape, but may also be non-circular shapes such as an ellipse or a polygon. These non-circular shapes can prevent the rotation of the mounting section, so that bolt fixing at only one place in the mount portion is required. Additionally, if these shapes are set such that the hole dimension on the side pressed by the supporting portion reduces gradually, the pressing becomes possible in a bitten manner, thereby preventing the occurrence of looseness or the like and accomplishing firmer supporting.

Although in this embodiment the mount rubber 10 is fitted over the mounting section 2a, it is also possible to employ a structure with no mount rubber.

It should be understood that the foregoing relates to only a preferred embodiment of the invention, and that it is intended to cover all changes and modifications of the embodiment of the invention herein used for the purpose of the disclosure, which do not constitute departures from the spirit and scope of the invention

What is claimed is:

1. A mounting structure for a wiper apparatus with first and second pivot shafts and a wiper motor incorporated into an integrated modular holder member, the mounting structure comprising:

a mounting section adjacent one pivot shaft for mounting the holder member to a vehicle body, said mounting section formed to extend away from the one pivot shaft;

a bracket attached to the vehicle body, the bracket including an insertion hole accepting said mounting section loosely in a state where said mounting section is tilted with respect to a mounting posture of said holder member; and a supporting portion integral with the bracket for supporting said mounting section, said holder member coming into contact with said supporting portion and pressed against one edge of said insertion hole to be supported on said supporting portion when said holder member takes the mounting posture.

2. A mounting structure for a wiper apparatus as defined in claim 1, wherein said insertion hole has a non-circular configuration.

3. A mounting structure for a wiper apparatus as defined in claim 2, wherein said insertion hole is designed such that it has multiple sides, and a side thereof against which said mounting section is pressed has a smaller hole dimension than an other side.

4. A mounting structure for a wiper apparatus as defined in claim 1, wherein said insertion hole is designed such that a side thereof against which said mounting section is pressed has a smaller hole dimension.

5. A mounting structure for a wiper apparatus as defined in claim 1, further comprising:

a mount provided over the mounting section.

6. A mounting structure for a wiper apparatus as defined in claim 5, wherein the mount is formed of an elastic material.

7. A mounting structure for a wiper apparatus as defined in claim 6, wherein the elastic material is rubber.

8. A mounting structure for a wiper apparatus as defined in claim 5, wherein said mount is in biting or cutting engagement with said one edge of the insertion hole.

9. A mounting structure for a wiper apparatus as defined in claim 1, wherein said mounting section is in biting or cutting engagement with said one edge of the insertion hole.

10. A mounting structure for a wiper apparatus as defined in claim 1, wherein said holder member further comprises:

another mounting section formed on another pivot shaft, said another mounting section formed to extend outwardly and to receive a fastener.

11. A mounting structure for a wiper apparatus as defined in claim 1, wherein the holder member further comprises:

a motor mounting section formed between said one pivot shaft side and another pivot shaft side and to receive a fastener.

12. A mounting structure for a wiper apparatus having a mounting section adjacent one pivot shaft, comprising:

a mount for mounting the mounting section to a vehicle body;

a bracket attached to the vehicle body, the bracket including an insertion hole accepting the mount loosely in a state where the mounting section is tilted with respect to a mounting posture of the mount; and a supporting portion integral with the bracket for supporting the mount, the mount coming into contact with the supporting portion and pressed against one edge of the insertion hole to be supported on the supporting portion when the mounting section takes the mounting posture.

13. The mounting structure for a wiper apparatus as defined in claim 12, wherein the insertion hole is designed such that it has multiple sides, and a side thereof against which the mounting section is pressed has a smaller hole dimension than an other side.

14. The mounting structure for a wiper apparatus as defined in claim 12, wherein the insertion hole has a non-circular configuration.

15. The mounting structure for a wiper apparatus as defined in claim 14, wherein the insertion hole is designed such that it has multiple sides, and a side thereof against which the mounting section is pressed has a smaller hole dimension than an other side.

16. The mounting structure for a wiper apparatus as defined in claim 12, wherein the mount is in biting or cutting engagement with one edge of the insertion hole.

* * * * *